United States Patent
Faulhaber

(10) Patent No.: US 6,253,608 B1
(45) Date of Patent: Jul. 3, 2001

(54) SIDE MOUNT LIQUID LEVEL SENSOR WITH ENHANCED FLOAT TRAVEL

(75) Inventor: A. Mark Faulhaber, Cincinnati, OH (US)

(73) Assignee: Standex International Corporation, Cincinnati, OH (US)

( * ) Notice: Subject to any disclaimer, the term of this patent is extended or adjusted under 35 U.S.C. 154(b) by 0 days.

(21) Appl. No.: 09/384,912

(22) Filed: Aug. 27, 1999

(51) Int. Cl.[7] .............. G01F 23/30; G01F 23/56; H01H 35/18
(52) U.S. Cl. ............... 73/305; 73/308; 73/313; 200/84 C
(58) Field of Search ............... 73/305, 308, 313; 200/84 C; 29/622

(56) References Cited

U.S. PATENT DOCUMENTS

| | | | |
|---|---|---|---|
| 3,576,413 | 4/1971 | Creager et al. | 200/84 C |
| 3,588,404 | 6/1971 | Akeley | 200/84 C |
| 3,699,561 | 10/1972 | Putt | 200/84 C |
| 3,750,124 | 7/1973 | Barnes et al. | 340/244 E |
| 3,750,125 | 7/1973 | Ross et al. | 340/258 C |
| 3,849,770 | 11/1974 | Hayashida | 340/244 E |
| 3,868,485 | 2/1975 | Sykes et al. | 200/61.2 |
| 3,890,478 | 6/1975 | Riddel | 200/84 R |
| 3,934,103 | 1/1976 | Walstra | 200/84 C |
| 3,978,299 | 8/1976 | Takai | 200/84 C |
| 3,997,744 | 12/1976 | Higo | 200/84 C |
| 4,020,481 | 4/1977 | Nakagawa | 340/244 E |
| 4,090,049 | 5/1978 | Nogami | 200/84 C |
| 4,090,050 | 5/1978 | Siiberg | 200/84 C |
| 4,139,750 | 2/1979 | Rau | 200/84 R |
| 4,158,964 | 6/1979 | McCrea et al. | 73/290 V |
| 4,191,951 | 3/1980 | Fuzzell | 340/610 |
| 4,217,779 | 8/1980 | Masuda et al. | 73/313 |
| 4,270,033 | 5/1981 | Hoffmann | 200/84 C |
| 4,318,078 | 3/1982 | Reinartz et al. | 340/59 |
| 4,356,729 | 11/1982 | Kubota et al. | 73/308 |
| 4,481,389 | 11/1984 | Johnson | 200/84 C |
| 4,513,185 | 4/1985 | Walters | 200/84 C |
| 4,583,085 | 4/1986 | Beller | 340/618 |
| 4,594,584 | 6/1986 | Pfeiffer et al. | 340/620 |
| 4,600,820 | 7/1986 | Bruder et al. | 200/84 C |
| 4,609,796 | 9/1986 | Bergsma | 200/84 C |
| 4,637,254 | 1/1987 | Dyben et al. | 73/314 |
| 4,644,332 | 2/1987 | Graham | 340/624 |
| 4,744,808 | 5/1988 | Treu | 55/165 |
| 4,771,272 | 9/1988 | Barnes | 340/624 |
| 4,796,473 | 1/1989 | Custer | 73/308 |
| 4,801,926 | 1/1989 | Bitetti | 340/624 |
| 4,848,151 | 7/1989 | Bruder et al. | 73/308 |
| 4,883,928 | 11/1989 | Umehara | 200/81.9 M |
| 4,922,234 | 5/1990 | Murphy | 340/608 |
| 5,026,954 | 6/1991 | Cebulski | 200/84 C |
| 5,042,300 | 8/1991 | Benjey et al. | 73/308 |
| 5,050,430 | 9/1991 | Begin et al. | 73/292 |
| 5,083,115 | 1/1992 | Kamiya | 340/624 |
| 5,281,858 | * 1/1994 | Langved | 307/118 |
| 5,294,917 | * 3/1994 | Wilkins | 340/625 |
| 5,379,506 | 1/1995 | Park | 29/426.6 |
| 5,581,062 | 12/1996 | Gomez, Jr. | 200/84 C |
| 5,742,999 | 4/1998 | Gomez, Jr. | 29/622 |

FOREIGN PATENT DOCUMENTS

| | | | |
|---|---|---|---|
| 0521573 | 5/1972 | (CH) | 73/290 R |
| 2153327 | 5/1973 | (FR) | 73/290 R |

OTHER PUBLICATIONS

*KIP Leveline Liquid Control* "LS1 Series—Sidemount" (date unknown).

* cited by examiner

Primary Examiner—Hezron Williams
Assistant Examiner—Dennis Loo
(74) Attorney, Agent, or Firm—Wood, Herron & Evans LLP

(57) ABSTRACT

A side mount liquid level sensor (10) includes limit arms (100, 102) on the float (80) and limit wings (54, 56) on the switch housing, with the limit wings (54, 56) being spaced vertically from the stem (14) of the housing (11) whereby to allow float (80) to traverse a range of travel that is at least 50% of the vertical depth (D) of the slot (86) of float 80 and advantageously substantially equal to that depth (D). The spacing (58) between wings (54, 56) and stem (14) allows wings (100, 102) to pass therebetween for assembly, but not while sensor (10) is in use.

32 Claims, 3 Drawing Sheets

ID LIQUID LEVEL SENSOR
SIDE MOUNT LIQUID LEVEL SENSOR
WITH ENHANCED FLOAT TRAVEL

BACKGROUND OF THE INVENTION

I. Field of the Invention

The present invention relates to liquid level sensors such as are mounted though the side wall of a liquid container, referred to as side mount liquid level sensor assemblies.

II. Description of Prior Art

To monitor liquid level in a liquid container, Such as an automobile coolant overflow reservoir or windshield washer tank, it has been the practice to provide a liquid level sensor mounted to the container. The sensor includes a rod-like member or stem about which a float moves depending upon the liquid level in the container. A reed switch is held to the sensor with a magnet attached to the float moving towards and away from the switch to activate and deactivate the switch. Gaining in popularity are so-called side mount liquid level sensor assemblies which are mounted through the sidewall of the container such that the stem is held in a horizontal disposition. The reed switch is mounted inside the stem and the float moves vertically relative to the stem to bring a magnet held by the float vertically towards or away from the reed switch.

One side mount liquid level sensor assembly which has met with good success is shown in U.S. Pat. Nos. 5,581,062 and 5,742,999, assigned to the assignee hereof, and the disclosures of both of which are incorporated herein by reference in their entireties. In the liquid level sensor assembly there-shown, a switch housing is provided having a rod-like member extending between a mount end and an enlarged disk end, with the mount end adapted to be secured through the sidewall of a liquid container to hold the rod-like member in a generally horizontally disposition in the container. A float, referred to as a buoyant member, has a slot extending vertically therethrough between an open end and an oppositely disposed closed end. The rod-like member is received in the slot of the buoyant member such that the buoyant member can move vertically as the liquid level in the container varies. The open end of the slot is sized to normally receive the rod-like member therethrough and limit structure comprising arms on the buoyant member adjacent the open end and wings formed on the adjacent sidewalls of the rod-like member cooperate to normally prevent the float from falling away from the rod-like member.

In order to mount the float to the housing, the float is oriented at a ninety degree angle relative to the rod-like member such that the slot may pass over the wings and rod from the side. Thereafter, the float is rotated ninety degrees to bring the arms into confronting relationship with the wings to thereby prevent the float from coming away from the housing. This method of assembly has provided great advantages in the manufacture of the liquid level sensor assembly.

The foregoing notwithstanding, some situations have been encountered in which the switch does not work properly. In particular, the float is free to move vertically over a range of travel between two positions, one where the closed end of the slot is against the rod-like member (with the limit structures spaced apart) and one where confronting surfaces of the limit structures engage. The float moves to and between these positions as the fluid level in the container changes, thereby causing the magnet to move towards and away from the reed switch. The range of travel in the above-described device is about ¼ inch (or 6 mm). In some instances, it has been found that the switch does not reliably change state over that range of float travel.

SUMMARY OF THE INVENTION

In commercial devices based on the aforementioned patents, the vertical depth of the slot has been about 13 mm. Thus, the ¼ inch or 6 mm range of travel available for the float is less than fifty percent (50%) of the vertical depth of the slot. Hence, more of the slot depth is available for range of travel than is currently being utilized in the above-described devices. It is therefore one objective of the present invention to increase the amount of the slot depth which is traversed over range of travel of the float relative to the rod-like member, to thereby improve reliability of the device. It is a further objective of the present invention to increase that range of travel in a manner that does not interfere with the ability to assemble the float to the stem from the side as above-described.

The present invention provides a side mount liquid level sensor that satisfies the above objectives. To this end, and in accordance with one feature of the present invention, the limit structure previously associated with the rod-like member is moved such that its contact surface is spaced vertically away from the stem whereby the arms on the float engage the wings after the float has traversed a greater vertical distance relative to the rod-like member. In this wax, the limit structure of the float and the switch housing are configured such that the float distance travel, i.e., the distance the float can traverse, is more than 50% of the slot depth, and is advantageously more than 75% thereof. Most advantageously, the range of travel is more than 90% of slot depth so as to allow the float to traverse a distance substantially equal to the slot depth. In a particular embodiment, the range of travel is about 12 mm for a 13 mm vertical depth slot, which is thus double the range of travel previously achieved as above-described. With the float distance travel thus increased, the magnet associated with the float can move towards and away from the reed switch over a greater distance to thereby obtain more reliable performance.

In accordance with another feature of the present invention, the vertical spacing between the contact surface of the wings and the rod-like member is selected to accomplish the limit function without interfering with assembly of the float to the housing. To this end, the thickness of the float arms is advantageously larger than that vertical spacing so that in the normal angular orientation of the float relative to the stem, the buoyant member will not come away from the housing and/or the rod-like member cannot pass completely out of the slot. By the same token, however, the transverse width of the arms is not more than, and is advantageously less than, the spacing between the wing contact surfaces and the rod-like members so that rotation of the float to a second, different angular orientation, such as ninety degrees from the normal angular orientation, will allow the arms to pass through the space between the contact surfaces of the wings and the rod-like member to facilitate assembly from the side as was achieved with the previous device. The spacing is further advantageously selected in relation to the diameter of the float so that in the normal angular orientation of the float, it will not pass into or become lodged in that space.

By virtue of the foregoing, there is thus provided a side mount liquid level sensor that has the advantages of the sensor shown in the aforementioned patents, but which has a substantially enhanced float travel distance and yet can be assembled from side in the same manner as shown in the aforementioned patents. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE DRAWINGS

Figure 1:
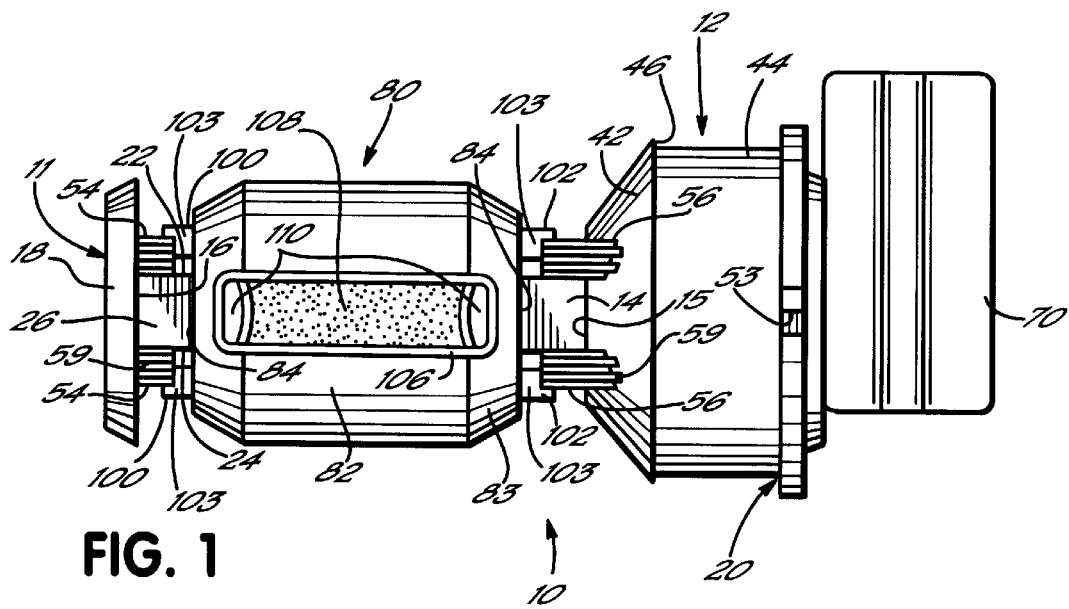
FIG. 1 is a top plan view of a side mount liquid level sensor in accordance with the principles of the present invention.
Figure 2:
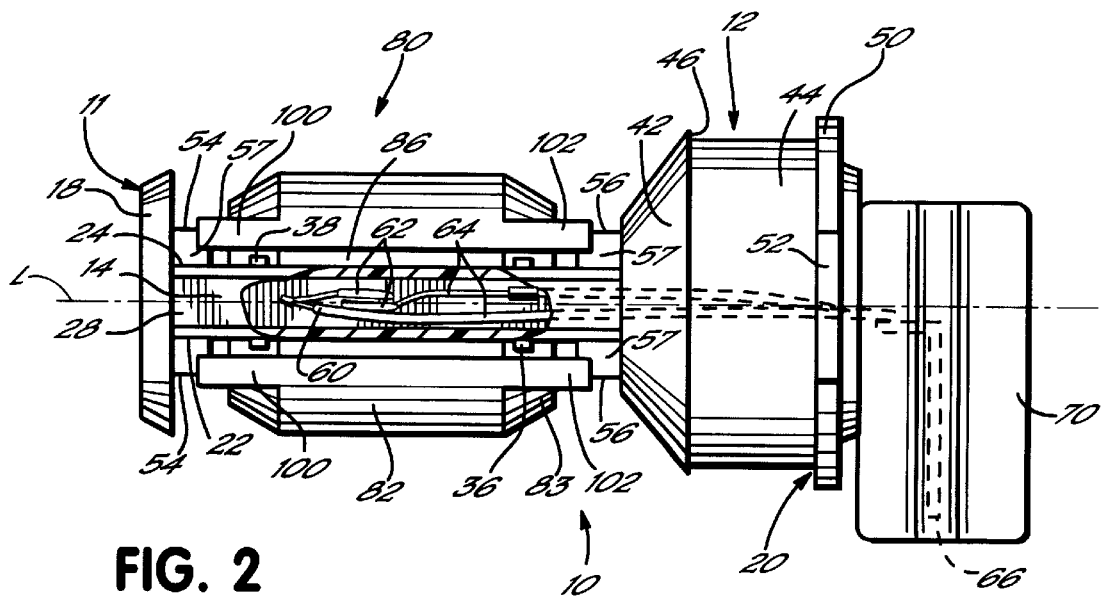
FIG. 2 is a bottom plan view, partially cut away, of the sensor of FIG. 1.
Figure 3:
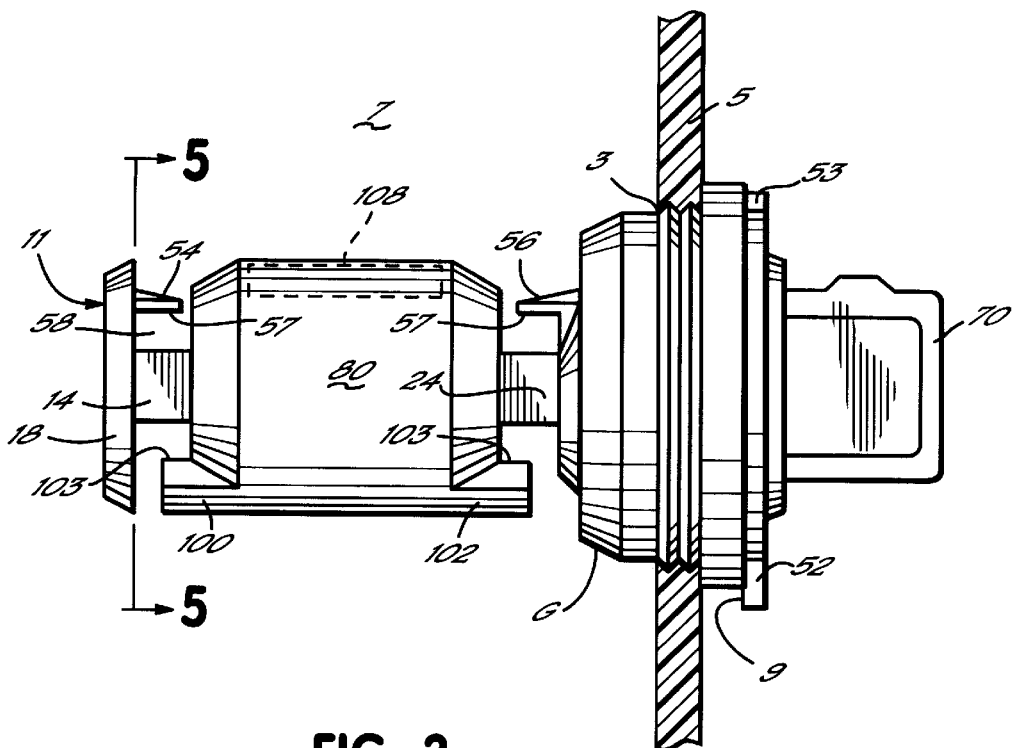
FIG. 3 is a side plan view of the sensor of FIG. 1, side-mounted to a liquid container and with the buoyant member in a first position.

With reference to FIGS. 1 and 2, there is shown a side mount liquid level sensor 10 in accordance with the principles of the present invention. Sensor 10 includes an injection molded plastic (e.g., polypropylene) switch housing component 11 comprised of a hollow mount end or support 12 and a hollow rod-like member 14 extending outwardly from and supported by the distal wall 15 of support 12. Formed integral to the distal end 16 of rod 14 is an enlarged disc 18 having a diameter slightly less than the diameter of support 12 at its proximal end 20. Disc 18 and end 20 are sized small enough to be received through a hole 3 in sidewall 5 of a liquid container 7 with a grommet G cooperating with proximal end 20 of support 12 to mount sensor 10 to sidewall 5 with rod-like member 14 in a horizontal disposition within container 7 as shown in FIG. 3.

Member 14 has a hollow interior with disc 18 sealing off distal end 16 thereof with proximal end at 15 opening into the interior of support 12. Member 14 may be rectangular in cross-section as defined by planar left, right, top and bottom sidewalls 22, 24, 26, 28, respectively (see also FIG. 5D). Bottom wall 28 may be recessed from the lower edges 30 of left and right sidewalls 22, 24 as seen, for example, in FIG. 5D. Also, formed on sidewalls 22 and 24 are a pair of vertically oriented projections 36, 38 (which may be rectangular, semi-circular or triangular in cross-section) which define respective planes (not shown) spaced or gapped from and parallel to walls 22 and 24 for a purpose to be described hereinafter.

Support 12 is formed with tapered distal cone portion 42 and proximal cylinder portion 44, the latter having a diameter slightly smaller than the proximal end 46 of cone 42 to provide a lip thereat. The proximal end 20 of support 12 terminates into an enlarged flange 50 with key 52 (FIG. 2) and, opposite key 52, triangular locator 53 (FIG. 1), which may be used to properly orient sensor 10 for mounting to container 7. Also, formed at respective ends 16 and 15 of rod 14, and extending from the adjacent disc 18 or cone 42, respectively, are a pair of rigid limit wings 54, 56. Wings 54 extend generally horizontally outwardly from disc 18 towards mount end 12, and wings 56 extend generally horizontally outwardly from end 12 towards disc end 18. Wings 54 and 56 each define a contact surface 57. Contact surfaces 57 are generally in the same plane which is spaced vertically away (above in FIGS. 3 and 4), but paralleled to, the plane defined by rod top wall 26 to thus define a space 58 therebetween as exemplified in FIGS. 3 and 5D. Each wing 54, 56 is also advantageously horizontally or laterally outboard of member 14 as seen in FIG. 1, although each pair of wings 54, 56 could be just one such wing 54 or 56, respectively. By way of example, wings 54 could be one such wing which extends across, but above, rod 14 as if the pair of wings were merged into one larger hing. Each wing 54, 56 includes two or more ribs 59 opposite surface 57 to rigidify the wing to thereby avoid undue flexure or breakage.

Fitted within the interior of member 14 is a switch, such as normally open, 0.5 A current switch rated magnetically actuatable reed switch 60 (FIG. 2) having its switch contacts 62 extending between ends 16 and 15 along the longitudinal axis L of rod 14. Switch 60 may have a sensitivity of between 10 and 60 ampere turns (AT), and is desirably in the 20–25 AT range. A pair of wires 64 electrically connect respective ones of switch contacts 62 to connector pins 66 held within plastic socket 70 mounted to support 12. Enclosing switch 60 within rod 14 and securing socket 70 to support 12 is a potting material (not shown) such as hot melt thermoplastic polyamide resin filling the interior of support 12 and gripping a leg (not shown) of socket 70 inside support 12.

Sensor 10 also includes a float or buoyant member 80 injected molded from plastic, two examples of which are polypropylene or nylon with an endothermic blowing or foaming agent. Member 80 is cylindrical in cross-section as defined by generally smooth outer wall 82 defining the diameter of float 80, which is advantageously about equal to the diameter of disc 18. Wall 82 of float 80 is chamfered inwardly about 15° as at 83 at opposite sides 84 of float 12. Formed within member 80 is a slot 86 which opens into each side 84. Slot 86 also has an open end 88 at wall 82 and an oppositely disposed closed end 90. Extending between ends 88 and 90 are planar left and right sidewalls 92, 94 which define a vertical depth D of slot 86. Formed at sides 84, and extending horizontally outwardly therefrom adjacent open end 88 of slot 86, are a pair of projecting limit arms 100, 102 each defining a contact surface 103. Arms 100, 102 cooperate with wings 54, 56 to limit the movement of float 80 relative to rod-like member 14 as will be described.

Float 80 also includes an aperture 106 through outer wall 82 disposed opposite slot 86. Aperture 106 is approximately the size of switch actuator magnet 108 mounted therein. Magnet 108 may be mounted with its north and south poles adjacent respective ones of the ends 84 of member 80 so as to extend in parallel to the longitudinal axis thereof, although other magnet geometries and/or polar arrangements may be used as will be appreciated by those skilled in the art. Magnet 108 is held in aperture 106 such as by melting or otherwise deforming portions of the edge of aperture 106 to define tabs 110 overlying magnet 108 to hold same in place. Alternatively, magnet 108 may be associated with float 80 in other ways, examples of which include insert molding, sonic welding, press-fitting, and adhesives. Aperture 106 may open at least partially into slot 86 for manufacturability, but not so large as to allow magnet 108 or rod 14 to pass therethrough. To this end, provided rod 14 cannot pass therethrough, end 90 is deemed to be a closed end which thus limits relative travel between rod 14 and float 80 to keep rod 14 within slot 86 thereat.

Figure 5B:
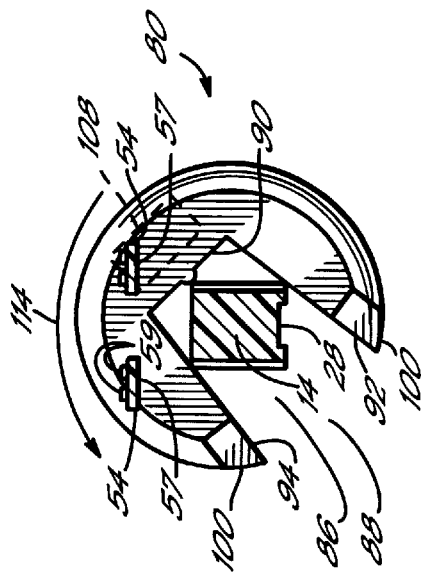
FIGS. 5A–C are views taken along line 5—5 of FIG. 3 for the purpose of describing steps to mount the buoyant member.
Figure 5D:
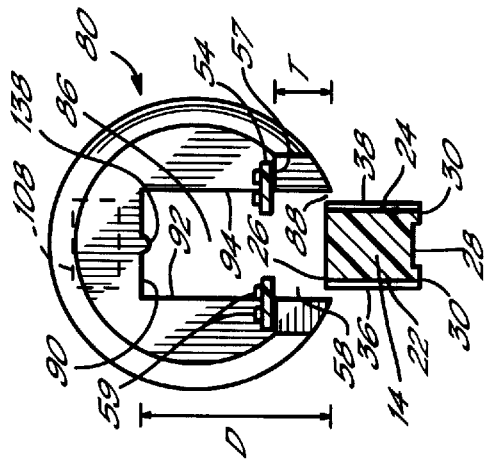
FIG. 5D is a view like FIG. 5C only along line 5D—5D of FIG. 4 showing the buoyant member in the second position.
Figure 5A:
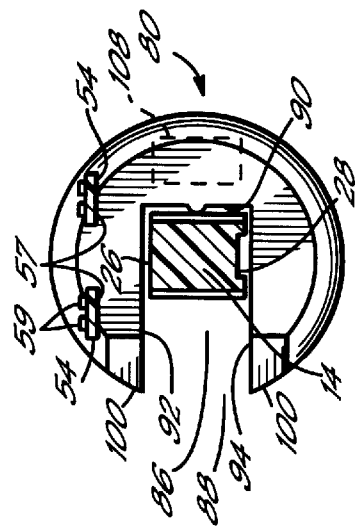
Figure 5C:
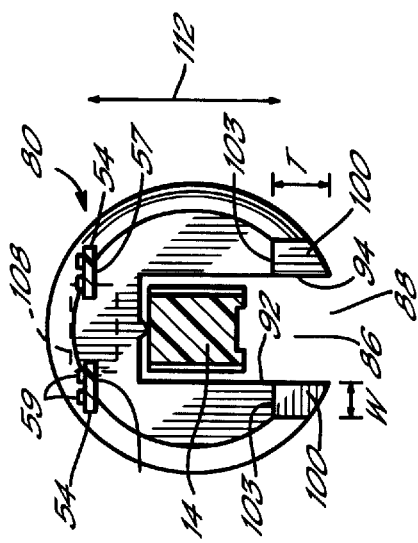

Sidewalls 92, 94 of slot 86 are spaced apart (with a slight draft) a distance slightly greater than the distance between the planes defined by rod-wall projections 36, 38 such that when member 80 is mounted to rod 14, member 80 is generally restrained from rotating completely around rod 14 but has sufficient space therein to be otherwise free to slide vertically relative thereto as indicated by arrow 112 in FIG. 5C such that magnet 108 moves towards and away from reed switch 60 to open or close same as appropriate. Also, the spacing provides non-clogging gaps (e.g., slot 84 is about 0.31 to 0.32 inch wide and the respective projections 36 or 38 define a distance of about 0.29 inch wide tip-to-tip) between rod sidewalls 22, 24 and slot sides 92, 94 which allows for some rotation of member 80, i.e., there is a loose fit, to reduce the likelihood of sticking or clogging.

Figure 4:
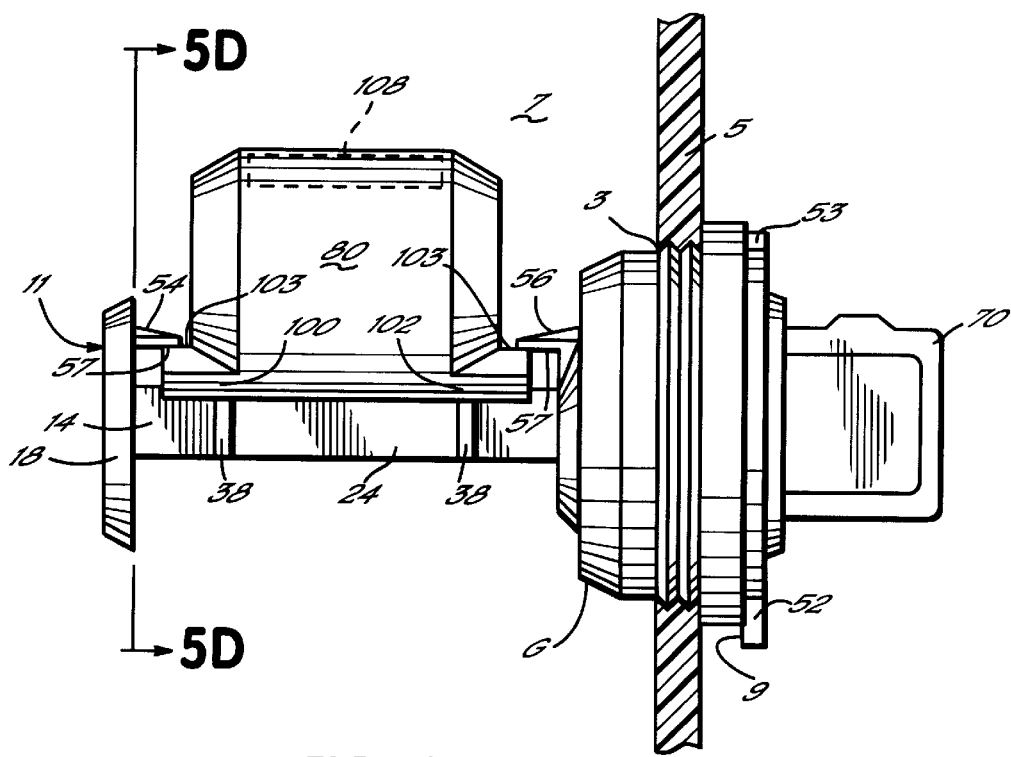
FIG. 4 is a side view like FIG. 3 with the buoyant member in a second position.

With float 80 mounted to housing 11, i.e., with stem 14 received in slot 86, and sensor 10 side-mounted to container 7, float 80 is free to move vertically between a first position (FIG. 3) and a second position (FIG. 4). The first position shown in FIG. 3 is representative of a low fluid level in container 7 whereas the second position of FIG. 4 is representative of a fluid level in container 7 that is above that low fluid level, i.e., at a higher fluid level. In the first position, rod-like member 14, and particularly top wall 26 thereof, is adjacent closed end 90 of slot 86 while open end 88 of slot 86, is spaced away from stem 14. In this first position, arm surfaces 103 are spaced out of engagement from wing surfaces 57 (FIG. 5C), and magnet 108 is very close to switch 60 to actuate same as is well understood in the art.

In the second position of float 80, surfaces 103 of float limit arms 100, 102 engage housing limit wing surfaces 57 (FIG. 5D) to limit travel of float 80. In this second position, a substantial portion of rod-like member 14 may extend out through open end 88 of slot 86 even though still considered adjacent thereto. Also, closed end 90 is spaced away from stem 14, to space magnet 108 well away from switch 60. The switch is thus deactivated as is also well understood. Wings 54, 56 and alms 100, 102 are advantageously configured to keep rod 14 from coming completely out of slot 86 to thereby retain float 80 on stem 14.

As can be seen by a comparison of FIGS. 3 and 4, the range of travel of float 80 is defined between the limits created at the first position by the wall 26 and closed end 90 and at the second position by the surfaces 57 and 103 and can be nearly the entire vertical depth D of slot 86 so as to reliably actuate and deactuate switch 60 as magnet 108 moves towards and away from switch 60 with variations in liquid level in container 7. The range of travel will depend largely on the vertical height of space 58 between wings 54, 56 and rod-like member 14 on the one hand, and the vertical thickness T of arms 100, 102 (FIG. 5C) on the other. The thickness T of arms 100, 102 is selected so as to be at least equal to, but advantageously slightly greater than, the height of space 58 between the planes defined by contact surfaces 57 and the top surface 26 of rod-like member 14. As a consequence, and as seen in FIG. 5D, even in the second position of float 80, there will be some portion of arms 100, 102 adjacent to rod-like member 14 so as to prevent float 80 from coming away from housing 11 sideways as viewed in FIG. 5B. The thickness of arms 100, 102 is advantageously selected and the placement of wings 58 advantageously selected so that the range of travel for a vertical depth D is greater than at least 50% of that vertical depth D, advantageously more than about 75%, and most advantageously greater than about 90% of the vertical depth D in which case the range of travel is substantially nearly equal to vertical depth D. In the particular embodiment shown, vertical depth D is approximately 13 mm while the range of travel between the first and second positions is approximately 12 mm.

The spacing 58 is also selected to facilitate mounting of float 80 to housing 11 with the side approach method of the previously mentioned patents, while also avoiding float 80 becoming lodged therein such as with chamfered wall 83. To this end, the width W of arms 100, 102 transverse to slot depth D is not greater than and is advantageously less than the height of space 58 so as to be able to fit therethough for side mounting of float 80. The wings 54, 56 are also positioned, however, so as to confront ends 84 of float 80 outside slot 86, irrespective of the position of float 80 due to liquid level in the container 7. Thus, the spacing 58 is also selected to be less than the thickness of float 80 measured along side 84 between closed end 90 of slot 86 and adjacent chamfered wall 83, such that the end 94 cannot readily pass into or become lodged in a space 58.

To mount member 80 to rod 14, member 80 is rotated 90° so that slot open end 88 opens towards a sidewall (e.g., right sidewall 24 as seen in FIG. 5A) and arms 100, 102 are disposed width-wise relative to spaces 58. Member 80 is slid laterally (to the left as indicated by arrow 110 in FIG. 5A) over rod 14 with arms 100, 102 passing through space 58 (between member 14 and wings 54, 56) with slot sidewalls 92, 94 juxtaposed parallel to top and bottom walls 26 and 28 of rod 14. As will be appreciated, end portions of rod 14 will extend out beyond the sides 84 of buoyant member 80. Member 14 is then rotated in the direction of arrow 114 as indicated in FIG. 5B until slot 86 is vertically oriented with sidewalls 92, 94 thereof juxtaposed parallel to vertical projections 36, 38 and rod sidewalls 22, 24, and magnet 108 is situated above bottom wall 28 of rod 14, all as seen in FIG. 5C. In this position of member 80, arms 100 and 102 of buoyant member 80, and particularly faces 103 thereof, extend out over and confront wings 54, 56, and particularly faces 57 thereof, as above-described.

As will be readily appreciated, when rod 14 is in its horizontal disposition as shown in FIGS. 5C and 5D, buoyant member 80 will move vertically (i.e. laterally) relative rod 14 depending upon the level of liquid (not shown) around member 80. Consequently, magnet 108 moves towards and away from rod 14 and reed switch 60 therein to thus open or close switch 60 depending upon the level of the liquid. Switch 60 is coupled via connector pins 66 to an electrical circuit (not shown) to activate the appropriate indicators.

Sensor 10 is fully seated in container 7, with magnet 108 at the top of the unit, so that member 80 is free to slide up and down and not impact against the sidewalls 22, 24 of rod 14. And, as member 80 slides, the gaps between slot sidewalls 92, 94 and rod sidewalls 22, 24 are maintained open due to vertical projections 36 and 38 so that material cannot become lodged therebetween and interfere with operation of sensor 10. Also, a projection 138 may be provided on closed end 90 of slot 86 to prevent sticking between rod top wall 26 and slot closed end 90. Projection 138 will also limit the range of travel and so is kept quite small or shallow, such as about 1 mm. Support 12 and rod 14 are made relatively short so that sensor 10 projects not more than about 47 mm into container 7 to thus allow sensor 10 to be used in tight quarters.

In use, member 80 is mounted to rod 14 from the side as previously described. Also, grommet G is slid over rod 14, and member 80 if it is already on rod 14, and onto portion 44 of housing 11. Sensor 10 is inserted, disc 18 first, into hole 3 of container 7 with magnet 108 on top until grommet G and mount end 12 mate snugly into hole 3. Member 80 is then free to move vertically relative to rod 14 depending upon the level of liquid in container 7. Reed switch 60 is electrically connected via pins 66 to appropriate electrical circuitry (not shown) such that the relative position of member 80 to rod 14 will control the circuitry. Specifically, member 80 travels at least 50% and up to over 90% of slot depth D between a first, low liquid level position and a second, higher liquid level position. The state of switch 60 indicates to the circuitry (not shown) whether or not the liquid level is low.

By virtue of the foregoing, there is thus provided a side mount liquid level sensor with enhanced rang,e of travel without adversely impacting the side assembly techniques previously found to provide advantages in such sensors.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, the thickness or placement of arms 100, 102 and wings 54, 56 may be varied so as to adjust the range of travel of float 80. Also, the surfaces 57 and 103 need not be planar as shown in the Figures. In use, the sensor 10 could be rotated 180° for use such that the second position correlates to low liquid level and the first position correlates to a high liquid level (with the open end 88 now at the top and magnet 108 now at the bottom of the sensor). Similarly, fewer than two pairs of arms 100, 102 might be used such as one arm 100 and one arm 102 confronting respective ones of wings 54 and 56. Also, while stem 14 is advantageously rectangular in cross-section with planar walls, other cross-sections may be utilized as will be readily appreciated by those skilled in the art. The float 80 could be mounted in other ways to stem 14, such as over the distal end 16 thereof (with a movable or later-attached disk 18), and so open end 88 could be closed off such as with an inverted U-shaped cap or portion. The cap of portion will extend above the otherwise open end 88 such that the end may still be considered open to allow a substantial portion of rod 14 to extend therethrough in the second position of float 80. The container 7 may include a recess or pocket in its sidewall 5 as shown in the aforementioned patents and/or provided with indicators on sidewall 5, which cooperate with key 52 or locator 53 to facilitate proper orientation of sensor 10 on mounting to container 7. Alternatively, key 52 and/or locator 53 may be eliminated. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A side mount liquid level sensor comprising:
   a side-mountable switch housing including a rod-like member adapted to extend in a generally horizontal disposition when the switch housing is side-mounted to a liquid container;
   a buoyant member having a slot within which is received the rod-like member, the slot having a vertical depth, such that the buoyant member is movable vertically relative to the horizontally disposed rod-like member between a first position and a second position depending upon the liquid level in said liquid container;
   a switch associated with the rod-like member and a switch actuator associated with the buoyant member for activating the switch depending upon the position of the buoyant member relative to the rod-like member; and
   limit structure associated with the buoyant member and the switch housing configured Such that the buoyant member can traverse a distance substantially equal to the slot depth as the buoyant member moves to and between the first and second positions.

2. The liquid level sensor of claim 1, the slot having an open end and an oppositely disposed closed end with the vertical depth defined therebetween, the rod-like member being located proximate the closed end of the slot and spaced away from the open end of the slot in the first position, the rod-like member being located proximate the open end of the slot and spaced away from the closed end of the slot in the second position.

3. The liquid level sensor of claim 2, the limit structure associated with the buoyant member being alms extending therefrom.

4. The liquid level sensor of claim 3, the arms extending from adjacent the open end of the slot.

5. The liquid level sensor of claim 3, the limit structure associated with the switch housing being wings spaced vertically from the rod-like member.

6. The liquid level sensor of claim 5, the wings being horizontally disposed when the rod-like member is horizontally disposed.

7. The liquid level sensor of claim 5, the arms having a vertical thickness and the wings being spaced at least a first vertical distance from the rod-like member, the first vertical distance not being, greater than the vertical thickness.

8. The liquid level sensor of claim 5, the arms having a width transverse to the slot depth and the wings being spaced at least a first vertical distance from the rod-like member, the width not being greater than the first vertical distance whereby the arms may pass between a space defined between the wings and the rod-like member in an angular orientation of the buoyant member which disposes the arms width-wise relative to the space.

9. The liquid level sensor of claim 5, the arms defining a first contact surface, the wings defining a second contact surface, the first and second contact surfaces engaging in the second position of the buoyant member and being spaced apart in the first position of the buoyant member.

10. The liquid level sensor of claim 2, the limit structure associated with the switch housing being wings spaced vertically from the rod-like member.

11. The liquid level sensor of claim 10, the wings being horizontally disposed when the rod-like member is horizontally disposed.

12. A side mount liquid level sensor comprising:
   a side-mountable switch housing including a rod-like member adapted to extend in a generally horizontal disposition when the switch housing is side-mounted to a liquid container;
   a buoyant member having a slot within which is received the rod-like member, the slot having a vertical depth, such that the buoyant member is movable vertically relative to the horizontally disposed rod-like member between a first position and a second position depending upon the liquid level in said liquid container;
   a switch associated with the rod-like member and a switch actuator associated with the buoyant member for activating the switch depending upon the position of the buoyant member relative to the rod-like member; and
   limit structure associated with the buoyant member and the switch housing configured such that the buoyant member can traverse a distance greater than at least fifty percent (50%) of the slot depth as the buoyant member moves to and between the first and second positions.

13. A side mount liquid level sensor comprising:
- a side-mountable switch housing including a rod-like member adapted to extend in a generally horizontal disposition when the switch housing is side-mounted to a liquid container;
- a buoyant member having a slot within which is received the rod-like member, the slot having a vertical depth, such that the buoyant member is movable vertically relative to the horizontally disposed rod-like member between a first position and a second position depending upon the liquid level in said liquid container;
- a switch associated with the rod-like member and a switch actuator associated with the buoyant member for activating the switch depending upon the position of the buoyant member relative to the rod-like member; and
- limit structure associated with the buoyant member and the switch housing, the limit structure being configured such that the buoyant member can traverse a distance greater than about seventy-five percent (75%) of the slot depth as the buoyant member moves to and between the first and second positions.

14. A side mount liquid level sensor comprising:
- a side-mountable switch housing including a rod-like member adapted to extend in a generally horizontal disposition when the switch housing is side-mounted to a liquid container;
- a buoyant member having a slot within which is received the rod-like member, the slot having a vertical depth such that the buoyant member is movable vertically relative to the horizontally disposed rod-like member between a first position and a second position depending upon the liquid level in said liquid container;
- a switch associated with the rod-like member and a switch actuator associated with the buoyant member for activating the switch depending upon the position of the buoyant member relative to the rod-like member; and
- limit structure associated with the buoyant member and the switch housing configured such that the buoyant member can traverse a distance greater than about ninety percent (90%) of the slot depth as the buoyant member moves to and between the first and second positions.

15. The liquid level sensor of claim 12, the slot having an open end and an oppositely disposed closed end with the vertical depth defined therebetween, the rod-like member being located proximate the closed end of the slot and spaced away from the open end of the slot in the first position, the rod-like member being located proximate the open end of the slot and spaced away from the closed end of the slot in the second position.

16. The liquid level sensor of claim 15, the limit structure associated with the buoyant member being, alms extending therefrom adjacent the open end of the slot.

17. The liquid level sensor of claim 15, the limit structure associate with the switch housing being wings spaced vertically from the rod-like member.

18. The liquid level sensor of claim 17, the limit structure associated with the buoyant member being alms extending therefrom adjacent the open end of the slot.

19. The liquid level sensor of claim 18, the arms having a vertical thickness and the wings being spaced at least a first vertical distance from the rod-like member, the first vertical distance not being greater than the vertical thickness.

20. The liquid level sensor of claim 18, the arms having a width transverse to the slot depth and the wings being spaced at least a first vertical distance from the rod-like member, the width not being greater than the first vertical distance whereby the arms may pass between a space defined between the wings and the rod-like member in an angular orientation of the buoyant member which disposes the arms width-wise relative to the space.

21. The liquid level sensor of claim 18, the arms defining a first contact surface, the wings defining a second contact surface, the first and second contact surfaces engaging in the second position of the buoyant member and being spaced apart in the first position of the buoyant member.

22. A side mount liquid level sensor comprising:
- a side-mountable switch housing including a rod-like member adapted to extend in a generally horizontal disposition when the switch housing is side-mounted to a liquid container;
- a buoyant member having a slot within which is received the rod-like member, the slot having a vertical depth extending between an open end and an oppositely disposed closed end, such that the buoyant member, when in a first angular orientation with respect to the rod-like member, is movable vertically relative to the horizontally disposed rod-like member between a first position and a second position depending upon the liquid level in said liquid container, the open end being sized to normally receive the rod-like member therethrough;
- a switch associated with the rod-like member and a switch actuator associated with the buoyant member for activating the switch depending upon the position of the buoyant member relative to the rod-like member; and
- first limit structure associated with the buoyant member and second limit structure associated with the switch housing and being spaced from the rod-like member such that the first limit structure can pass between the second limit structure and the rod-like member to permit the rod-like member to pass into the buoyant member slot through the slot open end with the buoyant member at a second, different angular orientation with respect to the rod-like member, the first and second limit structure cooperating to normally prevent the rod-like member from passing completely back out of the buoyant member slot through the open end thereof with the buoyant member in the first angular orientation with respect to the rod-like member.

23. The liquid level sensor of claim 22, the first limit structure being at least one arm extending, from the buoyant member.

24. The liquid level sensor of claim 23, the arm extending from adjacent the open end of the slot.

25. The liquid level sensor of claim 22, the second limit structure being at least one wing.

26. A side mount liquid level sensor comprising:
- a side-mountable switch housing including a rod-like member extending in a horizontal disposition between a mount end and an enlarged disc end, the mount end adapted to support the switch housing side-mounted to a liquid container with the rod-like member extending in a generally horizontal disposition within said liquid container, the housing further including at least one limit within surface extending in a generally horizontal disposition and spaced vertically from the rod-like member;
- a buoyant member having a slot within which is received the rod-like member, the slot having a vertical depth, such that the buoyant member is movable vertically relative to the horizontally disposed rod-like member between a first position and a second position depending upon the liquid level in said liquid container, the buoyant member having at least one horizontally extending limit arm surface positioned to confront the limit wing surface of the housing and movable into and out of engagement with the limit wing surface as the buoyant member moves into and out of one of the first and first and second positions whereby to limit movement of the buoyant member relative to the rod-like member as the limit wing surface and limit arm surface engage.

27. The liquid level sensor of claim 26, the limit wing surface extending from the mount end towards the disc end.

28. The liquid level sensor of claim 27, the housing including a second limit wing surface extending in a generally horizontal disposition from the disc end towards the mount end and spaced vertically from the rod-like member.

29. The liquid level sensor of claim 28, the buoyant member including a second horizontally extending limit arm surface positioned to confront the second limit wing surface of the housing and movable into and out of engagement with the second limit wing surface as the buoyant member moves into and out of one of the first and first and second positions whereby to limit movement of the buoyant member relative to the rod-like member as the second limit wing surface and second limit arm surface engage.

30. The liquid level sensor of claim 26, the limit wing surface extending from the disc end towards the mount end.

31. The liquid level sensor of claim 26, the housing including a pair of limit wing surfaces extending in a generally horizontal disposition and spaced vertically from the rod-like member, the buoyant member including a pair of horizontally extending limit arm surfaces positioned to confront the pair of limit wing surfaces of the housing and movable into and out of engagement with the pair of limit wing surfaces as the buoyant member moves into and out of one of the first and first and second positions whereby to limit movement of the buoyant member relative to the rod-like member as the pair of limit wing surfaces and pair of limit arm surfaces engage.

32. A side mount liquid level sensor comprising:

a side-mountable switch housing and a buoyant member movably supported on the switch housing between a first position and a second position, the switch housing including a rod-like member adapted to extend in a generally horizontal disposition when the switch housing is side-mounted to a liquid container, the buoyant member having a slot extending therein and receiving the rod-like member, the slot having an open end and an oppositely disposed closed end, the buoyant member movable vertically relative to the rod-like member, when the rod-like member is in a generally horizontal disposition, between first and second positions depending upon the liquid level in said liquid container, the open end of the slot being sized to normally pass the rod-like member therethrough, the rod-like member being located proximate the closed end of the slot and spaced away from the open end of the slot in the first position, the rod-like member being located proximate the open end of the slot and spaced away from the closed end of the slot in the second position;

a switch associated with the rod-like member and a switch actuator associated with the buoyant member for activating the switch depending upon the position of the buoyant member relative to the rod-like member; and first limit structure on the buoyant member and second limit structure on the switch housing configured such that they engage in the second position of with a substantial portion of the rod-like member extending outside the slot through the open end thereof.

* * * * *

UNITED STATES PATENT AND TRADEMARK OFFICE
CERTIFICATE OF CORRECTION

PATENT NO.    : 6,253,608 B1
DATED         : July 3, 2001
INVENTOR(S)   : A. Mark Faulhaber It is certified that error appears in the above-identified patent and that said Letters Patent is hereby corrected as shown below:

Column 1,
Line 18, please delete "arc" and replace with -- are --;
Line 34, please delete "horizontally" and replace with -- horizontal --;

Column 2,
Line 22, please delete "wax" and replace with -- way --;

Column 4,
Line 9, please delete "hing" and replace with -- wing --;

Column 5,
Line 34, please delete "alms" and replace with -- arms --;

Column 6,
Line 6, please delete "arc" and replace with -- are --;

Column 7,
Line 8, please delete "rang,e" and replace with -- range --;
Line 34, please delete "The cap of portion" and replace with -- The cap or portion --;
Line 67, please delete "Such" and replace with -- such --;

Column 8,
Line 13, please delete "alms" and replace with -- arms --;
Line 26, please "being, greater" and replace with -- being greater --;

Column 9,
Line 29, please delete "vertical depth such" and replace with -- vertical depth, such --;
Line 53, please delete "being, arms" and replace with -- being arms --;
Line 56, please delete "associate" and replace with -- associated --;
Line 59, please delete "alms" and replace with -- arms --;

Column 10,
Line 46, please delete "extending, from" and replace with -- extending from --;
Line 61, please delete "within" and replace with -- wing --;

Column 11,
Line 21, please delete "engagement" and replace with -- engagement --;

UNITED STATES PATENT AND TRADEMARK OFFICE
CERTIFICATE OF CORRECTION

PATENT NO. : 6,253,608 B1
DATED : July 3, 2001
INVENTOR(S) : A. Mark Faulhaber

It is certified that error appears in the above-identified patent and that said Letters Patent is hereby corrected as shown below:

<u>Column 12,</u>
Line 32, please delete "position of with" and replace with -- position with --;

Signed and Sealed this

Eleventh Day of March, 2003

JAMES E. ROGAN
*Director of the United States Patent and Trademark Office*